Nov. 11, 1969   P. J. NOVAK   3,477,164
ARTIFICIAL DRY FLY FISHING LURE
Filed Feb. 5, 1968
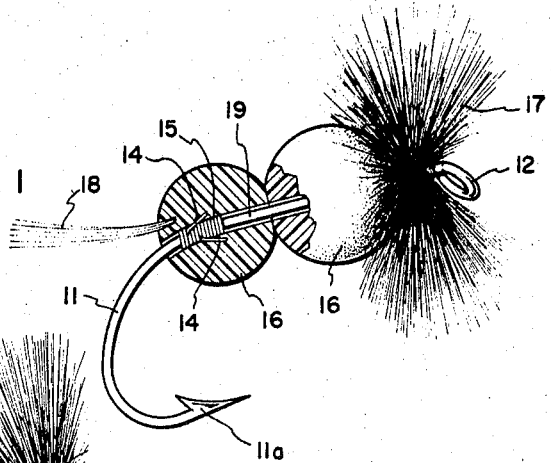
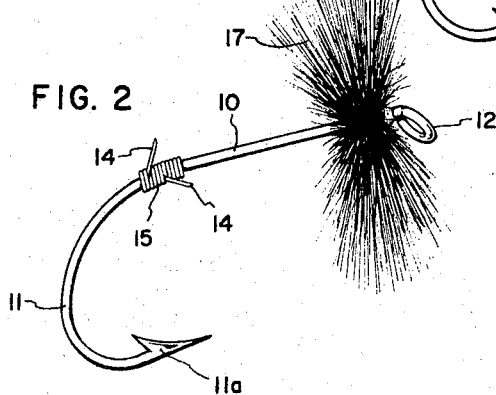
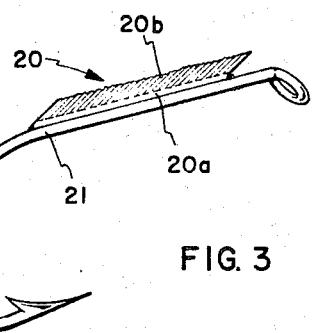
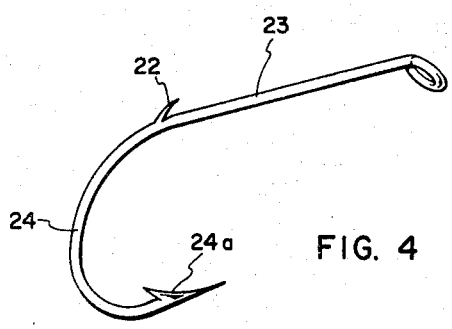
INVENTOR.
PHILLIP J. NOVAK
BY *Mallinckrodt and Mallinckrodt*
ATTORNEYS

United States Patent Office 3,477,164
Patented Nov. 11, 1969

3,477,164
ARTIFICIAL DRY FLY FISHING LURE
Phillip J. Novak, 1816 Westminster Ave.,
Salt Lake City, Utah 84108
Filed Feb. 5, 1968, Ser. No. 703,017
Int. Cl. A01k 85/08
U.S. Cl. 43—42.09
13 Claims

ABSTRACT OF THE DISCLOSURE

An artificial dry fly fishing lure having replaceable buoyant body components and usually having appendages, such as wings, hackle, tail. A barbed hook, which includes a shank and an eye for attachment to a fishing line, has its shank provided with projection or projections that permit body nodules of fragile, lightweight, and inexpensive buoyant material, such as a foamed plastic, to be freely slipped into place on the shank, but that thereafter resist displacement of such nodules. When damaged, these nodules can be easily removed by breaking or crumbling under applied pressure and can be easily replaced by fresh nodules of similar material. The appendages may be permanently affixed to the hook or shank or may be part of one or more body nodules.

BACKGROUND OF THE INVENTION

Field

The invention is concerned with fishing lures, particularly insect-simulating, lightweight lures commonly used by fishermen for dry fly fishing.

State of the art

Dry fly lures are ordinarily fabricated by affixing hair, feathers, and similar material, as appendages, to a small hook in a manner simulating the wings, body, hackle, etc. of a fly or other insect upon which fish are accustomed to feed. A lure formed in this manner is buoyant, since the large exposed surface area presented by the appendages distribute its total weight over a relatively large area of the water and the resulting small weight per unit area is supported by the surface tension of the water. Such a lure loses its buoyancy, however, when it becomes wet. It must then be replaced by a fresh dry fly lure or must be dried in some way before reuse.

A dry fly lure having a body made of foamed plastic permanently bonded to the hook shank so as to be buoyant even when wet has been proposed heretofore, but this material is fragile and easily damaged both during casting and when a fish bites without being hooked.

SUMMARY OF THE INVENTION

The invention provides a dry fly fishing lure having an insect-simulating body made up of one or more lightweight and buoyant body-nodules of a foamed plastic material or the like. In order to permit immediate and convenient repair of such lure, or alteration of its character, the nodules are replaceably but securely attached to the shank of a fish hook by means of a projection or projections, which may be formed integrally with the fish hook shank in conventional manner as rigid barbs, but which are preferably provided by attached flexible and resilient material that yields as a body-nodule is passed over it during installation thereof on the shank of the hook and that springs back or tends to spring back into the yieldable material as a barb following installation of the nodule, thereby impaling the nodule.

In this way a body-nodule is anchored securely in position during all uses of the lure, and, in turn, holds other similar nodules in position in instances where multiple nodules are employed. If and when a nodule is damaged and requires replacement, or if it should be determined that a nodule of different shape, color, or other characteristic should be used at any given time, the original nodule can be quickly and easily replaced by merely breaking or crumbling it with the fingers and threading a fresh nodule on the shank of the hook to take its place.

THE DRAWING

There is shown in the accompanying drawing specific embodiments of the invention representing what are presently regarded as the best modes of carrying out the generic concepts in actual practice.

In the drawing:

FIG. 1 is a pictorial view, with the body-nodules being shown largely in axial section to show the anchorage on the shank of the hook.

FIG. 2, a view corresponding to FIG. 1, but with the body-nodules removed;

FIG. 3, a view corresponding to FIG. 2, but showing a different embodiment hook and body-nodule retainer; and FIG. 4, a view corresponding to those of FIGS. 2 and 3, but showing a still different embodiment of hook and body-nodule retainer.

DETAILED DESCRIPTION OF ILLUSTRATED EMBODIMENTS

In the embodiment of FIGS. 1 and 2, there is illustrated a dry fly lure comprising a fish hook of conventional formation, having a shank 10, barbed hook portion 11 at one end of the shank, and an eye portion 12 at the other end of the shank. Lure-component anchoring means in the form of body-nodule retaining projections 14 are secured to shank 10 at approximately its juncture with hook portion 11; if desired for any reason, one or more additional retaining projections, similar or otherwise, can be provided along the shank forwardly thereof toward eye portion 12. The eye portion 12 can be replaced, of course, by any other means for attachment to a fishing line, as, for instance, when the fish hook is of snelled type.

Body-nodule-retaining projections 14 are provided by the projecting stub ends of a length 15 of a filament of some stiffly flexible material, such as the common monofilament fishing line made of one of the plastic materials currently employed for the purpose, wrapped tightly about the shank 10 or the hook portion 11 in the vicinity of the place where these portions of the fish hook merge, and held in position by a water insoluble adhesive. The projections 14 are preferably, but not necessarily, of barb formation in the sense that they are sloped forwardly toward the eye portion 12 of the fish hook. This orientation of the projections 14 enables a fragile body-nodule 16 to be easily slipped into place on the shank portion 10 of the fish hook with minimum internal disruption and with maximum anchorage thereof.

There are ordinarily a plurality of body-nodules 16, for example, the two shown in FIG. 1 representing segments of the body of an insect having appendages, i.e. a hackle 17 and tail 18. In the form illustrated, the hackle 17 is of horsehair or some other suitable material attached in conventional manner to the shank portion 10 of the fish hook immediately forwardly of the eye portion 12, and the tail 18 is of similar material fastened by a water-insoluble adhesive or in some other suitable manner to the rearmost body nodule 16, as illustrated in FIG. 1.

Each of the body nodules 16 is formed from a fragile buoyant material, such as a foamed styrene plastic, that can be crumbled by the exertion of manual pressure, as, for example, the pressure exerted between the thumb and index finger of a hand of the user. As such, it is easily replaceable if and when damaged or if and when it is desired to change the character of the lure. Such body-nodule is preferably provided with a hole 19 extending axially, so it can be easily "threaded" over the barbed end 11a of the hook portion 11 of the fish hook and on past the cradle of such hook portion to the shank 10, where it is pushed toward the eye portion 12 as far as it will go, being followed by one or more others. The last or rearmost body-nodule 16 is impaled on the retaining projections 14, as indicated in FIG. 1, where it remains anchored, serving to hold the forward nodule or nodules in place.

It is clear that any one or more of the body-nodules 16 can be easily and quickly removed by mere crumbling under manual pressure and can be easily and quickly replaced from a supply of new body-nodules that will be carried by a fisherman for that purpose. It may be desired to either replace one or more of the body-nodules that are damaged, or it may be desired to change the character of the lure by replacing, for example, one or more of the body-nodules of a given color with those of another color more appealing to fish under particular fishing conditions prevailing at any given time.

The embodiment of FIG. 3 utilizes a longitudinal section 20 of a feather, with shaft 20a and associated barbs 20b, as the body-nodule-retaining projections, the shaft 20a being securely fastened to the shank portion 21 of the fishing hook by a water insoluble adhesive or other suitable means.

In the embodiment of FIG. 4, the body-nodule-retaining projections 14 are replaced by a barb 22 upset from the metal of the shank portion 23 of the fish hook and corresponding in general to the barb 24a of the hook portion 24 of such fish hook.

Although this embodiment is susceptible of mass production at relatively low cost, it is not contemplated that it will serve as satisfactorily as the first embodiment.

Whereas this invention is here described and illustrated with respect to certain forms thereof, it is to be understood that many variations are possible without departing from the inventive subject matter.

I claim:

1. An artificial lure for use by dry fly fishermen, comprising a fish hook having a shank, a barbed hook portion at one end of the shank, and the means at the other end of the shank for attachment to a fishing line; lure-component anchoring means projecting from the shank adjacent to the hook portion comprising a barb directed to pass lure-components from said hook portion to said shank but to resist reverse movement thereof; and artificial lure components threaded onto said shank, at least the lure component closest to said portion being impaled on said anchoring means said lure components including at least one replaceable body-nodule of fragile buoyant material replaceably held on the shank by the said anchoring means so as to be easily removable by crumbling under applied pressure and easily replaceable by a new body-nodule of similar material.

2. A lure according to claim 1, wherein the anchoring means are located adjacent to the hook portion of the fish hook, and wherein said lure components comprise a plurality of body-nodules are positioned on the shank of the fish hook, one of said nodules being anchored by said anchoring means and the other or others of said nodules being freely slidable on said shank and retained by said one nodule that is anchored.

3. A lure according to claim 1, further including an insect-simulating appendage fixed to the shank adjacent to the means for attachment to a fishing line.

4. A lure according to claim 1, further including an insect-simulating appendage fixed to and projecting from at least one body nodule.

5. A lure according to claim 1, wherein the anchoring means comprise at least one barb formed integrally with the shank of the fish hook.

6. A lure according to claim 1, wherein the anchoring means are formed by a length of stiffly flexible material secured to the shank of the fish hook and having at least one portion projecting outwardly.

7. A lure according to claim 6, wherein the anchoring means are provided by at least one stub end of a length of a stiffly flexible filament securely wrapped about the shank of the fish hook.

8. A lure according to claim 6, wherein the anchoring means are provided by at least one portion of a feather secured to and extending longitudinally along the shank of the fish hook, with its barbs directed forwardly toward the means for attachment to a fishing line.

9. A lure according to claim 1, wherein the body-nodule material is a foamed plastic.

10. A method of constructing an artificial lure for use by dry fly fishermen comprising providing the shank of a fish hook with lure-component anchoring means projecting therefrom adjacent to the hook portion as a barb directed to pass lure-components from hook portion to shank but to resist reverse movement thereof; threading at least one body-nodule of fragile, buoyant material over the barbed hook portion of said fish hook and over said anchoring means on the shank of the said fish hook, whereby the body-nodule is securely held on said shank of the fish hook and may be quickly and easily crumbled under applied pressure and replaced during use of said lure.

11. A fish hook for use by dry fly fishermen in making an artificial lure, comprising a fish hook that includes a shank having a barbed hook portion at one end and means for attachment to a fishing line at the opposite end; and lure-component anchoring means projecting from said shank adjacent to the hook portion comprising a barb directed to pass lure-components from said hook portion to said shank but to resist reverse movement thereof, said anchoring means being formed by a length of stiffly flexible material secured to said shank and having at least one body-nodule-retaining projection, and a lure component comprising a replaceable body-nodule of fragile buoyant material replaceably held on the shank by said barb so as to be easily removable by crumbling under applied pressure and easily replaceable of a new body-nodule or similar material.

12. A fish hook according to claim 11, wherein the body-nodule-retaining projection is provided by a projecting stub end of a length of stiffly flexible filament securely wrapped about said shank.

13. A fish hook according to claim 12, wherein the body-nodule-retaining projection is provided by a portion of a feather secured to and extending longitudinally along said shank, with its barbs directed toward the means for attachment to a fishing line.

References Cited

UNITED STATES PATENTS

| | | | |
|---|---|---|---|
| 805,284 | 11/1905 | Greenway et al. | 43—44.8 |
| 859,227 | 7/1907 | Jackson | 43—42.37 X |
| 1,766,279 | 6/1930 | Brown | 43—42.24 X |
| 3,079,723 | 3/1963 | Roes | 43—42.37 X |
| 3,180,049 | 4/1965 | Gunderson | 43—42.37 X |
| 3,323,248 | 6/1967 | Sutryn | 43—42.37 |
| 3,344,549 | 10/1967 | Peters et al. | 43—42.24 X |
| 3,359,675 | 12/1967 | Call | 43—44.8 |

OTHER REFERENCES 214,228    3/1924    Great Britain.

SAMUEL KOREN, Primary Examiner

JAMES H. CZERWONKY, Assistant Examiner

U.S. Cl. X.R.

43—42.38, 42.53, 44.8

UNITED STATES PATENT OFFICE
CERTIFICATE OF CORRECTION

Patent No. 3,477,164                      November 11, 1969

Phillip J. Novak

It is certified that error appears in the above identified patent and that said Letters Patent are hereby corrected as shown below:

Column 3, line 44, cancel "the", second occurrence; line 51, after "said" insert -- hook --. Column 4, line 43, "of" should read -- by --; line 44, "or" should read -- of --.

Signed and sealed this 5th day of May 1970.

(SEAL)
Attest:

Edward M. Fletcher, Jr.                WILLIAM E. SCHUYLER, JR.
Attesting Officer                       Commissioner of Patents